US007764626B2

(12) United States Patent
Wilken

(10) Patent No.: US 7,764,626 B2
(45) Date of Patent: Jul. 27, 2010

(54) ROLE GROUPING OF HOSTS IN COMPUTER NETWORKS

(75) Inventor: Benjamin Wilken, Woodland Hills, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 1422 days.

(21) Appl. No.: 10/957,850

(22) Filed: Oct. 4, 2004

(65) Prior Publication Data

US 2006/0075081 A1  Apr. 6, 2006

(51) Int. Cl.
*H04L 12/28* (2006.01)
(52) U.S. Cl. ...................................... 370/254
(58) Field of Classification Search ................. 370/254
See application file for complete search history.

(56) References Cited

U.S. PATENT DOCUMENTS 5,736,923 A * 4/1998 Saab .......................... 340/429

| | | | | |
|---|---|---|---|---|
| 6,778,654 B1 * | 8/2004 | Takatori et al. | ........ | 379/212.01 |
| 6,823,190 B2 * | 11/2004 | Ford et al. | ............... | 455/456.3 |
| 7,092,985 B2 * | 8/2006 | Hubbard | ..................... | 709/201 |

OTHER PUBLICATIONS

"Vector Space Tensor Product", Eric W. Weisstein et al., From *MathWorld*—A Wolfram Web Resource, http://mathworld.wolfram.com/VectorSpaceTensorProduct.html, p. 1-2, Sep. 15, 2004.
"Vector Norm", Eric W. Weisstein, From *MathWorld*—A Wolfram Web Resource, http://mathworld.wolfram.com/VectorNorm.html, p. 1-2, Sep. 15, 2004.

* cited by examiner

*Primary Examiner*—Vincent P Harper
*Assistant Examiner*—Gary Au
(74) *Attorney, Agent, or Firm*—Park, Vaughan & Fleming LLP

(57) ABSTRACT

Techniques to assign nodes in a network to groups of nodes are described. The techniques include representing hosts in the network by property vectors that encode information about the hosts, identifying properties of the property vector by integers in the property vector for the host and determining proximity of hosts according to the property vectors and grouping the hosts according to the determined proximity.

35 Claims, 5 Drawing Sheets

ROLE GROUPING OF HOSTS IN COMPUTER NETWORKS

BACKGROUND

This invention relates generally to network management.

Enterprises have internal networks (intranets) that handle communications throughout an entire geographically dispersed organization. Managing such networks is increasingly costly, and the business cost of network problems increasingly high. Managing an enterprise network involves a number of inter-related activities including establishing a topology, establishing a policy and monitoring network performance. Network topology can have a significant impact on the cost of building a network and on the performance of the network once it has been built. An increasingly important aspect of topology design is network segmentation. In an effort to provide fault isolation and mitigate the spread of worms, enterprises segment their networks using firewalls, routers, VLANs and other technologies. In a network different users have different privileges. Some users have unlimited access to external networks while other users have highly restricted access. Some users may be limited in the amount of bandwidth they may consume on particular routes, and so on. The number of policies is open ended. Operators also monitor network performance. Almost every complex network suffers from various localized performance problems. Network managers detect these problems and take action to correct them.

Another aspect of network management is detecting and dealing with security violations. Increasingly, networks are coming under attack. Sometimes the targets are chosen at random (e.g., most virus-based attack). Sometimes the targets are chosen intentionally (e.g., most denial of service attacks). These attacks often involve compromised computers within the enterprise network. Early detection of attacks plays a critical role in reducing damage to networks and systems coupled to the networks.

SUMMARY

Conducting these activities on a host-by-host basis is not feasible for large networks. Network managers need a technique to structure views of networks to allow them to make decisions at larger levels of granularity. Today, this is often done on an ad hoc basis that relies on humans best guesses about logical relationships among computers on the network and among users of those computers.

According to an aspect of the invention, a computer implemented method to assign nodes in a network to groups of nodes includes representing hosts in the network by corresponding property vectors that encode information about the hosts. The method also includes identifying properties of the hosts by integers in the property vectors for the host and determining proximity of hosts according to the property vectors and grouping the hosts according to the determined proximity.

Other embodiments are within the scope of the claims. For example, each host is identified by an integer in the property vector {0, N−1} where N is the number of hosts in the network or the number of hosts being considered for grouping. Each port/protocol is identified by an integer in a property vector {0, P−1} where P is the number of protocols and transport-level ports on the network. Proximity can include determining proximity according to neighbor hosts, common protocols client-server relationships and so forth. Grouping sets a grouping radius to control the degree of grouping. The grouping radius is a distance in a multi-dimensional property vector space. For grouping by neighbors over N dimensions, the value for dimension d is 1 if a host d is a neighbor of host h, and the value is 0 otherwise. For grouping by protocols for P dimensions, the value for dimension d is 1 if host h uses protocol d, and 0 otherwise. For grouping by client-server there are 2 dimensions a first dimension 0 is 1 if host h is a client and 0 otherwise a second dimension 1 is 1 if host h is a server and 0 otherwise. Grouping includes grouping by combinations of properties. Grouping by a combination of properties includes producing a tensor product of the property vectors representing of the values of the individual properties. The grouping further includes determining a group's center of gravity (COG(g)) as the sum of the property vectors of its member hosts, divided by the number of hosts. The similarity of two hosts is obtained by producing a dot product of the property vectors of the hosts and dividing the value by the greater L1-norm in both vectors.

According to an additional aspect of the invention, a computer program product residing on a computer readable medium for assigning nodes in a network to groups of nodes includes instructions for causing a computer to construct property vectors to represent hosts in the network. The property vectors encode information about the hosts and identify properties of the hosts by integers in the property vectors for the host. The program further includes instructions to determine proximity of hosts according to the property vectors and group the hosts according to the determined proximity.

According to an additional aspect of the invention, an apparatus includes a processor, a memory for executing a computer program and a computer readable medium for storing the computer program product for assigning nodes in a network to groups of nodes. The computer program includes instructions for causing a computer to construct a property vector to represent hosts in the network, the property vector encoding information about the hosts and identify each property of the property space by an integer in the property vector for the host. The program further includes instructions to determine proximity of hosts according to the property vectors and group the hosts according to the determined proximity.

One or more advantages can be provided from the above. Grouping hosts assists in the management and understanding of large enterprise networks. Grouping involves partitioning hosts into related groups based on operational characteristics. Grouping exposes the logical structure of a network, simplifies network management tasks such as policy checking and network segmentation, and can improve accuracy of network monitoring and analysis such as in intrusion detection. Grouping can reduce the number of logical units that a network administrator deals with.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
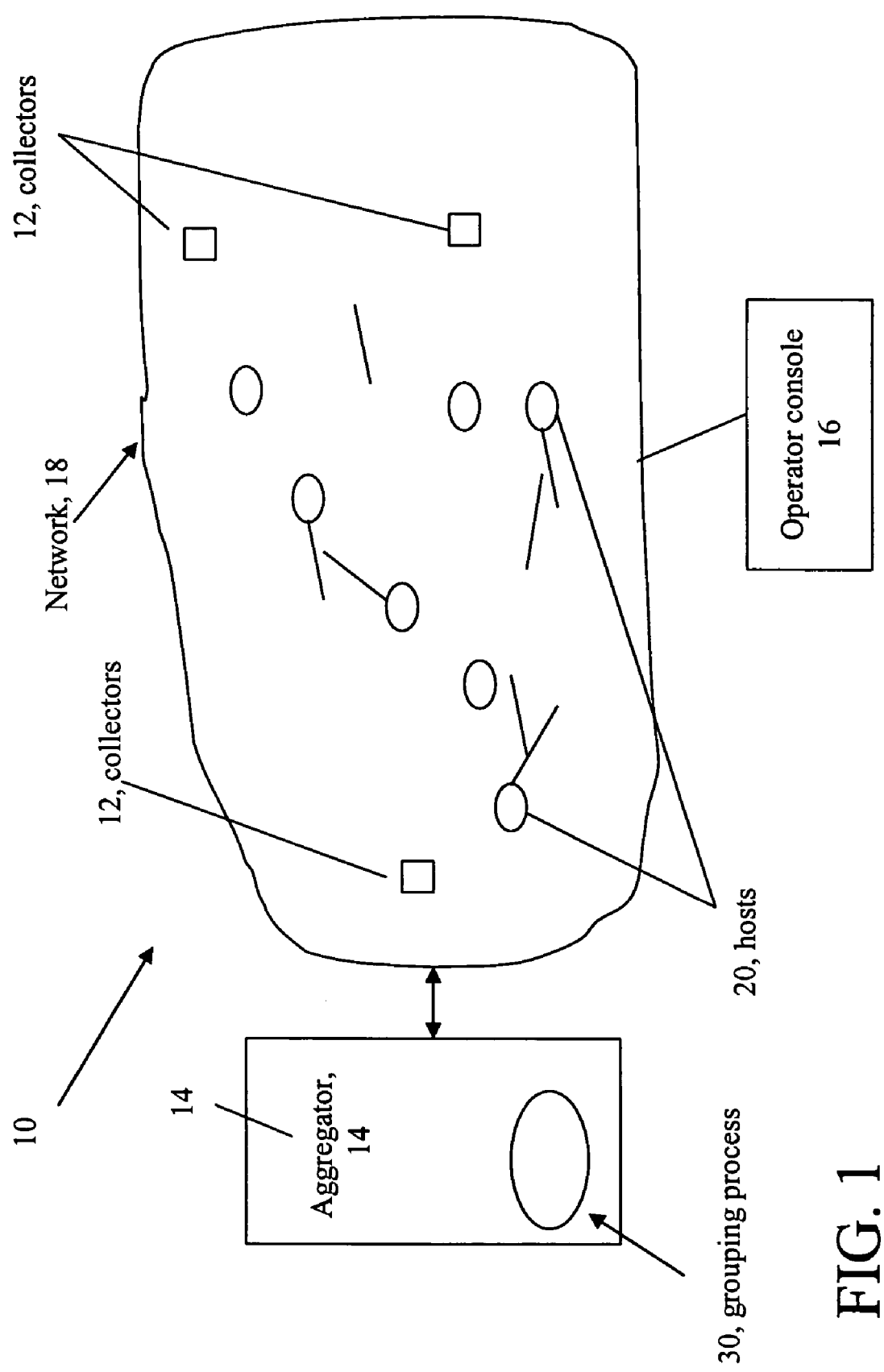
FIG. 1 is a block diagram of a network.

Referring to FIG. 1, a network includes an intrusion detection system 11 includes collectors 12 (or flow probes) and an aggregator 14. System 10 detects and deals with security violations in large-scale enterprise networks 18 that service a large plurality of computers and other devices such as switches, routers, etc, e.g., "hosts" 20, spread over different geographic locations. The collectors or probes 12 collect data and the aggregator 14 operates on data and flows reported to the aggregator to produce information regarding operation of the network 18. In addition, the aggregator 14 executes a grouping process 30 that efficiently partitions hosts 20 on the network 18 into groups in a way that exposes the logical structure of the network 18. The grouping process 30 can be used in many different applications and can be viewed as a general network management tool. The grouping process 30 can be run on various devices in the network, the aggregator 14 being just an example.

The grouping process 30 assigns hosts to groups and classifies the hosts according to various characteristics including host neighbors, protocols used by hosts, and host's client-server behavior characteristics among others. When grouping by neighbors, hosts are placed in the same group if the hosts share a significant portion of their neighbors (e.g., hosts with which they exchange packets). When grouping by protocol, hosts are placed in the same group if they use a significant number of the same protocols. When grouping by client-server behavior, hosts are placed in the same group if they are both clients, or are both servers, or both clients and servers.

Grouping can also be based on combinations of these parameters (by neighbor, by protocol, by client-server, by neighbor and protocol, by neighbor and client-server, by protocol and client server, by all for instance). The greater the number of parameters, the more fine-grained are the groups produced. For example, grouping by neighbor and by protocol is accomplished when two hosts are placed in the same group when they use the same protocols with the same neighbors. Other parameters and combinations of parameters are possible and could be managed in the same conceptual framework.

The grouping process 30 provides a mechanism to give network administrators and other users fine-grained control over grouping so that meaningful results can be provided to an administrator or other user, e.g., at an operators console 16. Users can affect the grouping process by specifying a target number of groups. An alternative implementation might allow the user to specify a target grouping "radius" (e.g., a measure of group size).

Figure 2:
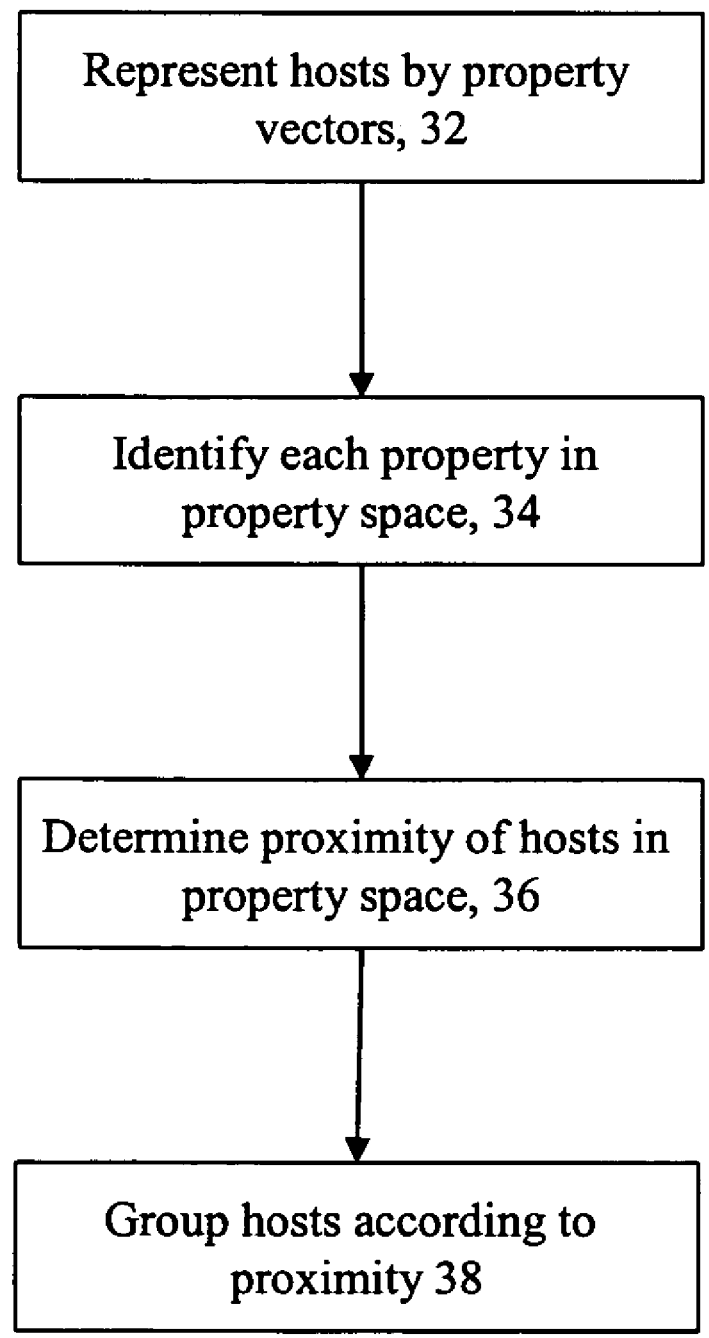
FIG. 2 is a flow chart.

Referring to FIG. 2, grouping process 30 uses vector arithmetic to determine similarity in behavioral parameters shared by hosts. Each host is represented 32 by a "property vector" that encodes behavioral parameter information about the host. For instance, the property vector can encode information about a host's peers, protocols used by the host and whether the host is a client or a server, or both. Other information can also be encoded. A property vector is constructed for each host that grouping considers. The properties used for grouping determine the number of entries in each property vector for each of the hosts.

The property vector defines the host's location in a multi-dimensional "property space." An N-dimensional vector is a vector with N coordinates, or entries, and it is an element of an N-dimensional vector space. The number of dimensions of a property vector depends on the properties that are being used for grouping. For instance, if the grouping process groups by neighbors in a network with k hosts, each property vector will have k entries (one for each possible neighbor), and will describe the location of the corresponding host in a k-dimensional property space.

The process identifies 34 each property of the property space. Properties are defined as follows: For hosts, each host is identified by an integer $\{0, N-1\}$ where N is the number of hosts in the network or the number of hosts being considered for grouping. For protocols, each port/protocol is identified by an integer $\{0, P-1\}$ where P is the number of protocols and transport-level ports on the network. These integers are used to reference entries in property vectors, as described below.

The grouping process 30 determines 36 the proximity of the points described by hosts' property vectors in multi-dimensional property space, such that the hosts are grouped together according to the proximity of the points described by their property vectors. That is, given host A through host C, if hosts A and B are closer to each other in property space than to host C, then it is more likely that hosts A and B will be grouped together rather than with host C.

The grouping process 30 uses a grouping radius set by the user to control the degree of grouping. The grouping radius is a distance in the multi-dimensional property space and controls the degree of similarity needed between hosts for the hosts to be grouped in the same group. Since every value in the property vector is a 0 or 1 (i.e., the property is true or false), all possible property points fall within a unit hypercube in the property space.

A host h's property vector depends on the type of grouping performed. Thus, if the grouping is by neighbors, over N dimensions, the value for dimension d is 1 if a host d is a neighbor of host h, and the value is 0 otherwise. If grouping is performed by protocols for P dimensions, the value for dimension d is 1 if host h uses protocol d, and 0 otherwise. If grouping is by client-server there are 2 dimensions. Dimension 0 is 1 if host h is a client and 0 otherwise. Dimension 1 is 1 if host h is a server and 0 otherwise.

For grouping by combinations of properties, the property vector space is the tensor product of the vector spaces for each individual property. For example, if grouping by neighbors and protocols, the property vectors have N*P dimensions. Dimension (i P+j) is 1 if host h uses protocol j to communicate with host i, and 0 otherwise. Similarly, if grouping by neighbors, protocols, and client-server roles, property vectors have 2*N*P dimensions. Dimension 2(i P+j) is 1 if host h is a client of host i on protocol j, and dimension 2(i P+j)+1 is 1 if host h is a server of host i on protocol j and so forth.

Property vectors are represented as sparse vectors. A group's center of gravity (COG(g)) is the sum of the property vectors of its member hosts, divided by the number of hosts, e.g., the center of gravity (COG) is the centroid of the points defined by the member hosts' property vectors. The similarity of two hosts "(SIM(h1,h2))" is obtained by performing a dot product of their property vectors and dividing the value by the "greater L1-norm" in both vectors, e.g., SIM(h1,h2) is the fraction of properties that the two hosts h1, h2 have in common.

Figure 3:
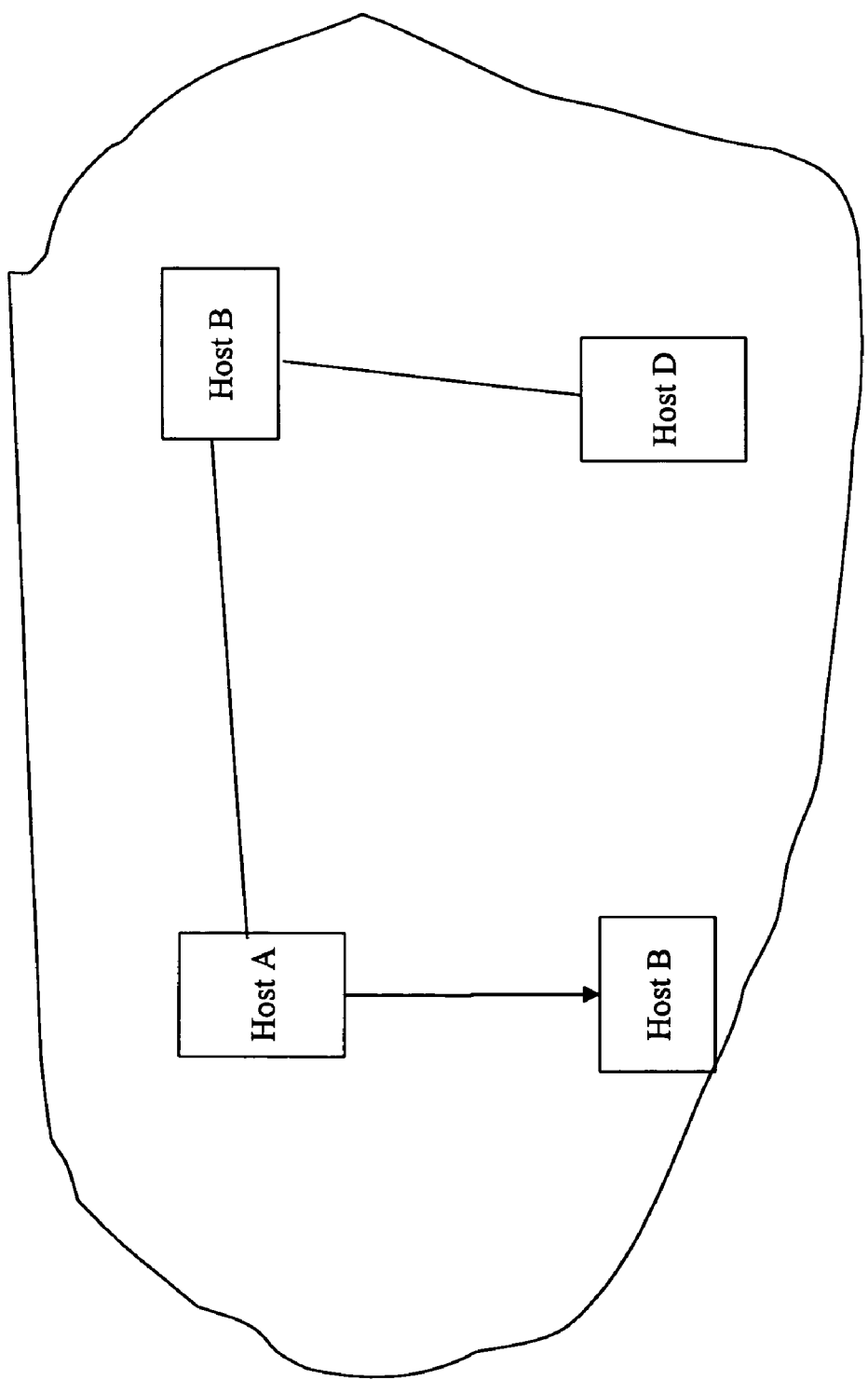
FIG. 3 is a diagram depicting relationships between nodes.

Referring to FIG. 3, consider 4 hosts, Host A through Host D, associated, as illustrated. By associated is meant that the hosts share some parameters, e.g., packets, client-server relation, and so forth. The process 30 constructs property vectors considering the neighbor property and assuming that the integer IDs are A:0, B:1, C:2, D:3. The property vectors are as follows:

A=(1,1,1,0)
B=(1,1,0,1)
C=(1,0,1,0)
D=(0,1,0,1)

and host similarities are as follows:
SIM(A,A)=SIM(B,B)=SIM(C,C)=SIM(D,D)=1
SIM(A,B)=(A dot B)/3=2/3
SIM(A,C)=(A dot C)/3=2/3
SIM(A,D)=(A dot D)/3=1/3
SIM(C,D)=(C dot D)/2=0

Figure 4:
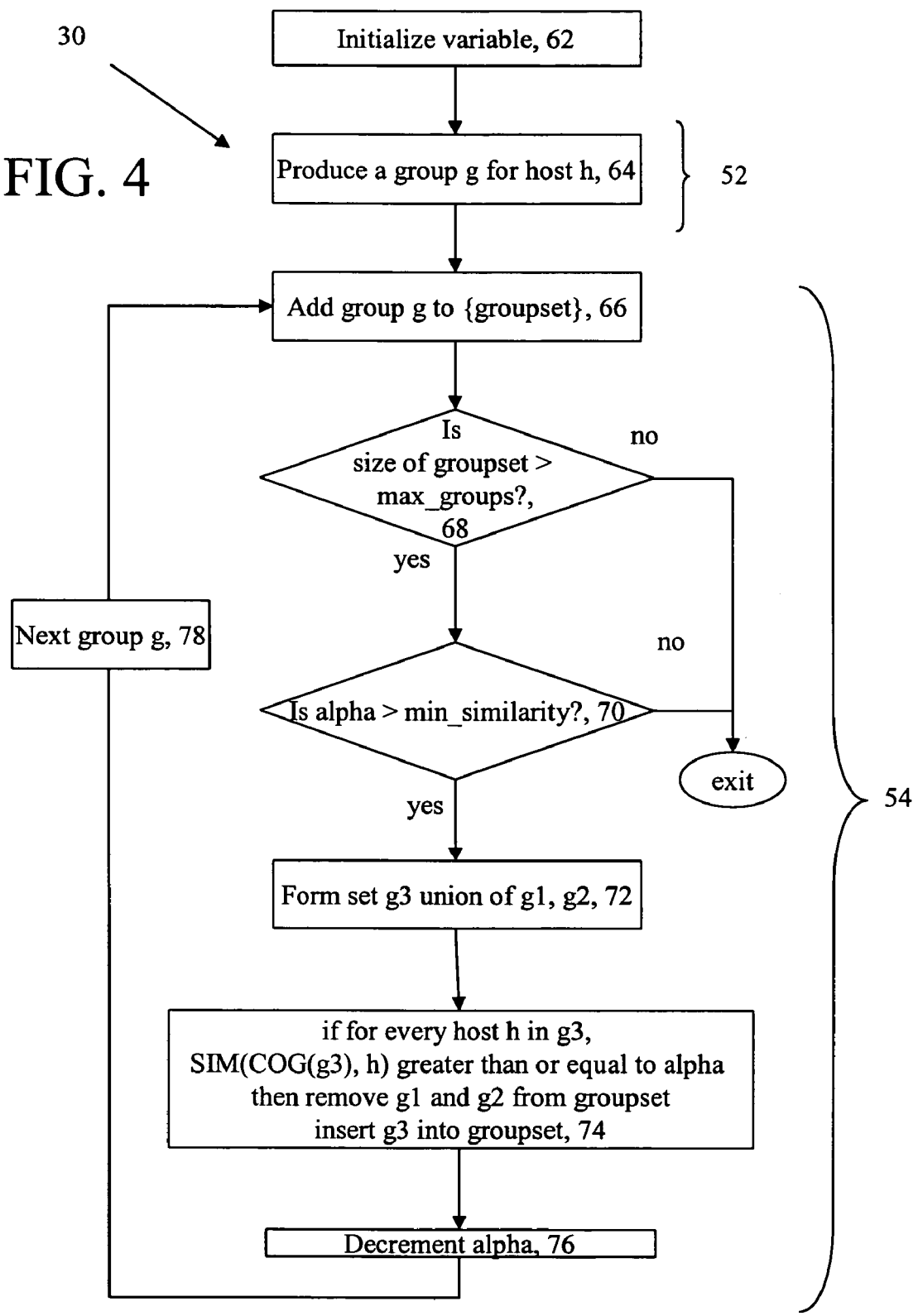
FIG. 4 is a flow chart depicting a grouping process.

Referring to FIG. 4, exemplary details of grouping 38 are shown. Initially, each host is placed 52 into a separate group, so that there are as many groups as hosts. Subsequently, the groups are merged 54 until the grouping process 38 reaches a target number of groups or a maximum grouping radius. Intuitively, each group can be considered as a sphere in a property space, and the property vectors of all the hosts in the group are within a certain distance of the center (COG) of the sphere.

The grouping process 38 initializes 62 variables used in the process 38, thus setting alpha=1, the value "decrement" =0.02 and "groupset" to a null set ({ }). The process 38, for each host "h" in the set of hosts to be grouped, produces 64 a group "g" containing just a host "h." The process 38 adds 66 each of the groups "g" to groupset, thus adding g1, g2, g3 . . . gn to groupset. The process 38 tests 68 to see whether the size of groupset is greater than a value max_groups and tests 70 whether alpha is greater than a min_similarity value. If the size of groupset is not greater than max_groups or alpha is not greater than the min_similarity value, the process exits. Otherwise, for each of a pair of groups, e.g., "g1", "g2" in groupset the process 38 forms 72 another group "G3", which is the union of "g1" and "g2." The process tests 74 all of the hosts in the group "G3" and if for every host "h" in "G3", determines whether the similarity of the centroid (COG) of group "G3" and the host "h" is greater than the value "alpha." If the similarity of the centroids is greater than alpha, the process removes "g1" and "g2" from groupset and inserts "G3" into groupset. The process 38 calculates a new value of alpha by decrementing 76 alpha by the value "decrement" and gets 78 the next group "g."

Exemplary pseudo code is shown below.

```
alpha = 1
decrement = .02
groupset = { }
for each host h
    create a group g containing just h
    add g to groupset
    while (size(groupset) > max_groups and alpha > min_similarity)
        for each pair of groups g1, g2 in groupset
            g3 = g1 union g2
            if for every host h in g3, SIM(COG(g3), h) >= alpha then
                remove g1 and g2 from groupset
                insert g3 into groupset
        alpha = alpha - decrement
```

Grouping hosts assists in the management and the understanding of large enterprise networks. Grouping involves partitioning hosts into related groups based on operational characteristics. Grouping exposes the logical structure of a network, simplifies network management tasks such as policy checking and network segmentation, and can improve accuracy of network monitoring and analysis such as in intrusion detection. Grouping can reduce the number of logical units that a network administrator deals with.

The property vector grouping process approach is extensible, e.g., can accommodate an arbitrary number of properties, while being computationally efficient. The property vector approach is easy to model and visualize and thus can lend itself to graphical visualization of hosts. The property vector approach relies on vector arithmetic, so it could be implemented on a dedicated vector processor.

Figure 5:
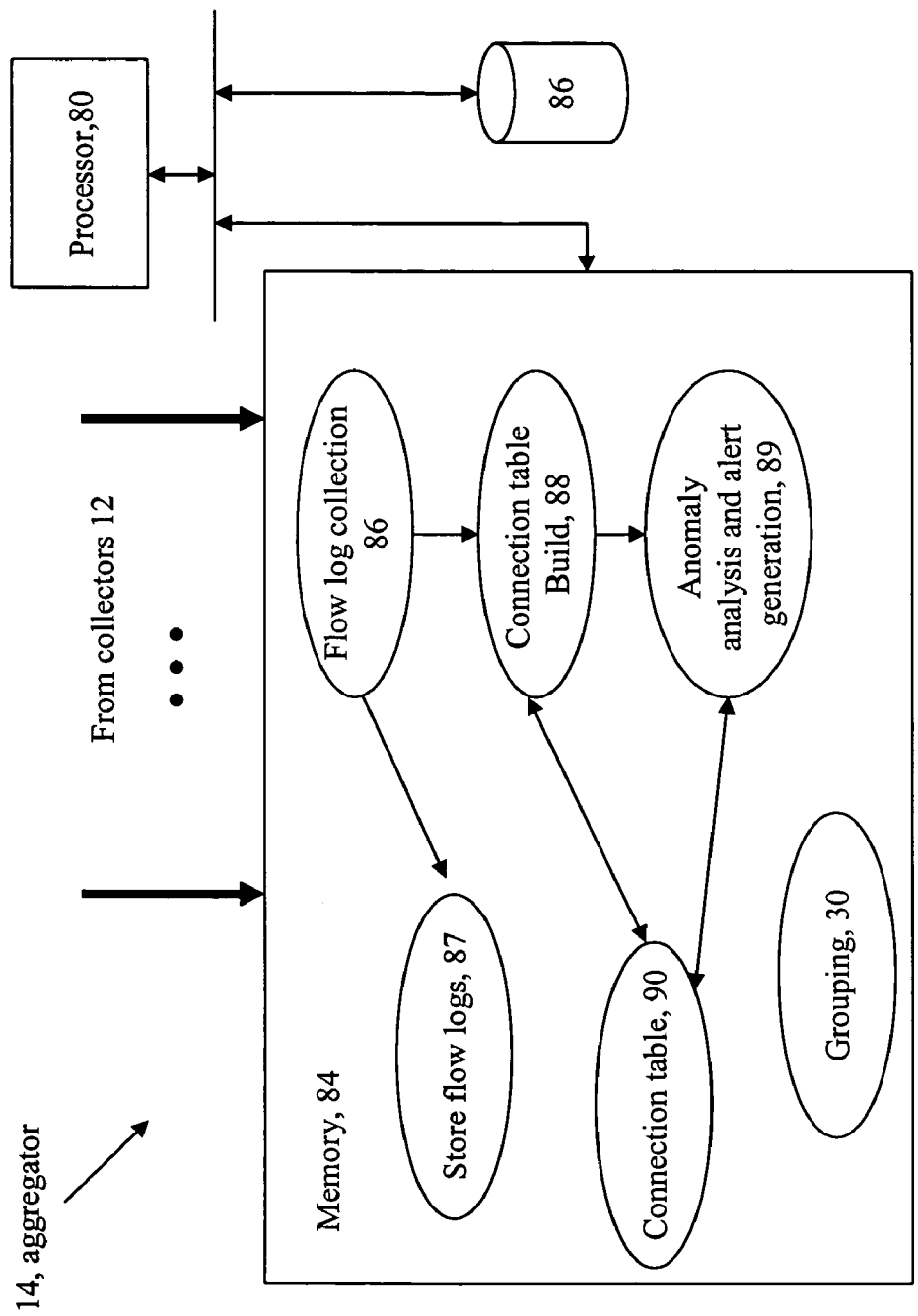
FIG. 5 is a block diagram depicting a computer system configured as an aggregator.

Referring to FIG. 5, the aggregator 14 is a device (a general depiction of a general purpose computing device is shown) that includes a processor 80 and memory 82 and storage 84. Other implementations such as Application Specific Integrated Circuits are possible. The aggregator 14 executes the grouping process 30. In some embodiments, the grouping process is a standalone process that is executed on a computer system device to group hosts on a network for use in various applications. In other embodiments the grouping process 30 discussed above is used in conjunction with other processes run on the aggregator 14. Such other processes can include a process 86 to collect flow data from flow collectors 12 or probes, a process 87 to store flow records, and a process 88 to produce a connection table 90 from the flow data or flow records. In addition, in some embodiments, the aggregator 14 includes anomaly analysis and event process 89 to detect anomalies and process anomalies into events that are reported to the operator console 16 or cause the system 10 to take action in the network 18.

Anomalies in the connection table can be identified as events including denial of service attacks, unauthorized access attempts, scanning attacks, worm propagation, network failures, addition of new hosts, and so forth. Flow records are a source of data for the connection table. From the flow records long and short connection tables for heuristics and so forth are produced. Flow records can be recorded on disk (in flow logs) and are used to compute aggregate statistics for reporting and to document network activity over time (for forensic purposes).

A number of embodiments of the invention have been described. Nevertheless, it will be understood that various modifications may be made without departing from the spirit and scope of the invention.

What is claimed is:

1. A computer implemented method to assign nodes in a network to groups of nodes, comprising:
    representing hosts in the network by corresponding property vectors that encode information about the operational characteristics of the hosts;
    identifying properties corresponding to operational characteristics of the hosts by integers in the property vectors for a respective host;
    determining a degree of similarity in operational characteristics of hosts according to the property vectors; and
    grouping the hosts according to the determined similarity in operational characteristics, which comprises one or more of the following operations:
        grouping the hosts by neighbors over N dimensions, wherein a value for dimension d comprises a first value if a host d is a neighbor of host h, and a second value otherwise;
        grouping the hosts by protocols for P dimensions, wherein a value for dimension d comprises a third value if host h uses protocol d, and a fourth value otherwise; and
        grouping the hosts by client-server over two dimensions, wherein a first dimension comprises a fifth value if host h is a client and a sixth value otherwise, and wherein a second dimension comprises a seventh value if host h is a server and an eighth value otherwise.

2. The method of claim 1 wherein each host is identified by an integer in the property vector {0, N−1} where N is the number of hosts in the network or the number of hosts being considered for grouping.

3. The method of claim 2 wherein each port/protocol is identified by an integer in the property vector {0, P−1} where P is the number of protocols and transport-level ports on the network.

4. The method of claim 3 wherein determining proximity includes determining proximity according to neighbor hosts, common protocols, or client-server relationships.

5. The method of claim 1 further comprising setting a grouping radius to control the degree of grouping.

6. The method of claim 5 wherein the grouping radius is a distance in a multi-dimensional property vector space.

7. The method of claim 1, wherein grouping further comprises: grouping by combinations of properties.

8. The method of claim 7 wherein grouping by a combination of properties comprises producing a tensor product of the vector spaces for each individual property.

9. The method of claim 8 wherein grouping further comprises determining a group's center of gravity (COG(g)) as the sum of the property vectors of its member hosts, divided by the number of hosts.

10. The method of claim 9 wherein similarity of two hosts is obtained by producing a dot product of the property vectors of the hosts and dividing the value by the greater L1-norm in both vectors.

11. The method of claim 1, wherein the first value comprises 1, and the second value comprises 0.

12. The method of claim 1, wherein the third value comprises 1, and the fourth value comprises 0.

13. The method of claim 1, wherein the fifth and seventh values comprise 1, and the sixth and eighth values comprise 0.

14. A computer readable medium encoded with a computer program product to assign nodes in a network to groups of nodes, the computer program product comprising instructions to cause a computer to:
construct property vectors to represent hosts in the network, the property vectors encoding information about the operational characteristics of the hosts; for the hosts
identify properties of the hosts by integers in the property vectors for a respective host; and
determine a proximity of hosts; and
group the hosts according to the determined proximity, which comprises one or more of the following operations:
grouping the hosts by neighbors over N dimensions, wherein a value for dimension d comprises a first value if a host d is a neighbor of host h, and a second value otherwise;
grouping the hosts by protocols for P dimensions, wherein a value for dimension d comprises a third value if host h uses protocol d, and a fourth value otherwise; and
grouping the hosts by client-server over two dimensions, wherein a first dimension comprises a fifth value if host h is a client and a sixth value otherwise, and wherein a second dimension comprises a seventh value if host h is a server and an eighth value otherwise.

15. The computer readable medium of claim 14 wherein each host is identified by an integer in the property vector {0, N−1} where N is the number of hosts in the network or the number of hosts being considered for grouping.

16. The computer readable medium of claim 14 wherein each port/protocol is identified by an integer in a property vector {0, P−1} where P is the number of protocols and transport-level ports on the network.

17. The computer readable medium of claim 14 wherein instructions to determine proximity determines proximity according to host neighbors, common protocols, or client-server relationships.

18. The computer readable medium of claim 14 further comprising instructions to set a grouping radius to control the degree of grouping.

19. The computer readable medium of claim 18 wherein the grouping radius is a distance in a multi-dimensional property vector space.

20. The computer readable medium of claim 14 wherein grouping further comprises instructions to: group by combinations of properties.

21. The computer readable medium of claim 20 wherein instructions to group by combination of properties comprises instructions to producing a tensor product of the vector spaces for each individual property.

22. The computer readable medium of claim 21 wherein instructions to group further comprises instructions to determine a group's center of gravity (COG(g)) as the sum of the property vectors of its member hosts, divided by the number of hosts.

23. The computer readable medium of claim 14 wherein a similarity of two hosts is obtained by producing a dot product of the property vectors of the hosts and dividing the value by the greater L1-norm in both vectors.

24. The computer readable medium of claim 14, wherein the first value comprises 1, and the second value comprises 0.

25. The computer readable medium of claim 14, wherein the third value comprises 1, and the fourth value comprises 0.

26. The computer readable medium of claim 14, wherein the fifth and seventh values comprise 1, and the sixth and eighth values comprise 0.

27. An apparatus comprising:
a processor;
a memory for executing a computer program and
a computer readable medium for storing the computer program product for assigning nodes a network to groups of nodes, the computer program product comprising instructions to cause a computer to:
construct property vectors to represent hosts in the network, the property vectors encoding information about the operational characteristics of the hosts;
identify properties of the property vector by integers in the property vectors for the hosts; and
determine a proximity of hosts based on the property vectors; and
group the hosts according to the determined proximity, which comprises one or more of the following operations:
grouping the hosts by neighbors over N dimensions, wherein a value for dimension d comprises a first value if a host d is a neighbor of host h, and a second value otherwise;
grouping the hosts by protocols for P dimensions, wherein a value for dimension d comprises a third value if host h uses protocol d, and a fourth value otherwise; and
grouping the hosts by client-server over two dimensions, wherein a first dimension comprises a fifth value if host h is a client and a sixth value otherwise, and wherein a second dimension comprises a seventh value if host h is a server and an eighth value otherwise.

28. The apparatus of claim 27 wherein each host is identified by an integer in the property vector {0, N−1} where N is the number of hosts in the network or the number of hosts being considered for grouping.

29. The apparatus of claim 27 wherein each port/protocol is identified by an integer in a property vector $\{0, P-1\}$ where P is the number of protocols and transport-level ports on the network.

30. The apparatus of claim 27, wherein the first value comprises 1, and the second value comprises 0.

31. The apparatus of claim 27, wherein the third value comprises 1, and the fourth value comprises 0.

32. The apparatus of claim 27, wherein the fifth and seventh values comprise 1, and the sixth and eighth values comprise 0.

33. A computer implemented method to assign nodes in a network to groups of nodes, comprising:

representing hosts in the network by corresponding property vectors that encode information about the operational characteristics of the hosts;

identifying properties corresponding to operational characteristics of the hosts by integers in the property vectors for a respective host;

determining a degree of similarity in operational characteristics of hosts according to the property vectors; and grouping the hosts according to the determined similarity in operational characteristics, which comprises grouping the hosts by neighbors over N dimensions, wherein a value for dimension d comprises a first value if a host d is a neighbor of host h, and a second value otherwise.

34. A computer implemented method to assign nodes in a network to groups of nodes, comprising:

representing hosts in the network by corresponding property vectors that encode information about the operational characteristics of the hosts;

identifying properties corresponding to operational characteristics of the hosts by integers in the property vectors for a respective host;

determining a degree of similarity in operational characteristics of hosts according to the property vectors; and grouping the hosts according to the determined similarity in operational characteristics, which comprises grouping the hosts by protocols for P dimensions, wherein a value for dimension d comprises a first value if host h uses protocol d, and a second value otherwise.

35. A computer implemented method to assign nodes in a network to groups of nodes, comprising:

representing hosts in the network by corresponding property vectors that encode information about the operational characteristics of the hosts;

identifying properties corresponding to operational characteristics of the hosts by integers in the property vectors for a respective host;

determining a degree of similarity in operational characteristics of hosts according to the property vectors; and grouping the hosts according to the determined similarity in operational characteristics, which comprises grouping the hosts by client-server over two dimensions, wherein a first dimension comprises a first value if host h is a client and a second value otherwise, and wherein a second dimension comprises a third value if host h is a server and a fourth value otherwise.

\* \* \* \* \*